United States Patent [19]

Kanome et al.

[11] Patent Number: 4,954,380

[45] Date of Patent: Sep. 4, 1990

[54] OPTICAL RECORDING MEDIUM AND PROCESS FOR PRODUCTION THEREOF

[75] Inventors: Osamu Kanome, Kawasaki; Takayoshi Tsutsumi, Tokyo, both of Japan

[73] Assignee: Canon Kabushiki Kaisha, Tokyo, Japan

[21] Appl. No.: 276,543

[22] Filed: Nov. 28, 1988

[30] Foreign Application Priority Data

Nov. 27, 1987 [JP] Japan .................................. 62-297482
Jan. 18, 1988 [JP] Japan .................................. 63-006948
Jan. 18, 1988 [JP] Japan .................................. 63-006949

[51] Int. Cl.$^5$ ................................. B32B 3/02
[52] U.S. Cl. ......................................... 428/64; 428/65; 428/212; 428/913; 346/76 L; 346/135.1; 369/278; 369/288; 369/275.1; 430/311; 430/945
[58] Field of Search .................. 428/64, 65, 212, 913; 346/76 L, 135.1; 369/275, 278, 288; 430/311, 945

[56] References Cited

U.S. PATENT DOCUMENTS 4,519,064 5/1985 Takasi et al. .................. 369/111

FOREIGN PATENT DOCUMENTS

171046 9/1984 Japan .
209041 8/1988 Japan .

*Primary Examiner*—Patrick Ryan
*Attorney, Agent, or Firm*—Fitzpatrick, Cella, Harper & Scinto

[57] ABSTRACT

An optical recording medium comprises an optical recording layer on a transparent substrate. The optical recording layer is then selectively irradiated with an energy beam to form therein a tracking region for guiding a laser beam for recording and reproduction. The tracking region is free of unevenness and has an optical characteristic different from that of the portion of the optical recording constituting a data recording region which has not been irradiated with the laser beam.

15 Claims, 2 Drawing Sheets

OPTICAL RECORDING MEDIUM AND PROCESS FOR PRODUCTION THEREOF

FIELD OF THE INVENTION AND RELATED ART

The present invention relates to an optical recording medium for optical data recording and reproduction and a process for producing the same.

In recent years, as the size of information circulated in the world increases, many proposals have been made about optical recording media for the recording and reproduction of optical data, such as optical disks, optical cards and optical tapes as effective means for processing a wide variety of data. In one such optical recording media, binary-coded data are recorded and detected as a change in reflectivity or change in surface shape, i.e., by the presence of absence of pits, yielding a change in reflected light intensity.

As an optical recording medium utilizing a change in optical reflectivity, there has been proposed a so-called heat-mode recording material. In this type of material the recording layer is irradiated with spots of an energy beam such as a laser beam to cause a local state change in the layer. This type of recording material is a so-called 'DRAW (direct read after write)' medium which does not require a post treatment, such as development, after writing of data but can be directly read after writing, and is further capable of high density recording and also additional writing.

For such optical recording media, it has been known to form tracking grooves on the substrate surface at a prescribed pitch so as to effect accurate tracking by a laser beam for the optical recording and reproduction of data. More specifically, the tracking is effected by detecting a phase difference in the reflected laser beam caused by a minute unevenness given by the tracking groove which corresponds to an optical guide groove. According to this system, the groove functions as a guide for readout, so that the tracking control accuracy is increased and a higher access speed is provided than when a substrate with no tracking groove is used.

Hitherto, tracking grooves providing such functions have been formed by using a stamper provided with a spiral groove or concentric grooves through (1) an injecting molding process using a thermoplastic resin or (2) a so-called 2P process wherein a photopolymer is cast and hardened in contact with a stamper by UV light to transfer a groove onto a flat substrate. In any of the above two forming processes, the product substrate is subjected to the incidence and transmitting of energy beam therethrough, so that the substrate is strongly desired to show good optical characteristics, particularly a high optical transmittance and small birefringence. Accordingly, the selection of usable materials have been severely restricted.

Further, the formation of tracking grooves by the above-mentioned processes still has involved the following problems.

More specifically, in the injection molding process, the transfer of minute unevenness is not complete, and some stress remains in the substrate to leave a cause for warp or distortion. On the other hand, the 2P process involves difficulties such as poor productivity, obstacle to re-use of the stamper because of partial remaining of the UV resin, or separation of tracking portions from the substrate in case of poor contact between the substrate and the UV resin. Further, if a substrate has a pre-groove, there arise problems, such as a larger film thickness at the groove part than the land portion in spin-coating of a dye, and occurrences of streak irregularities accompanying defects such as a projection in a pre-groove, which lead to high level of noise and non-uniform sensitivity. Further, at the time of separation of the substrate from the stamper, the substrate surface is liable to be roughened to provide a poor surface accuracy, which leads to increased noise.

In order to solve such problems, JP-A (Kokai) Sho59-171046 has proposed a process for forming a guide groove wherein a substrate is coated with a dye film capable of absorbing visible light to cause deformation and then with a reflective film for data recording, and the dye film is irradiated with a visible light laser beam to cause contraction of the dye film to form a tracking groove. The process, however, is accompanied by a problem of poor productivity because it is required to form two layers of the dye film and the reflective film for data recording and to form tracking grooves line by line. Further, the contraction of the dye film by a laser cannot be accurately controlled so that the tracking grooves are liable to the formed at different depths. Further, according to the deformation of the dye film, the planarity of the dye film per se and the reflective film is liable to be deteriorated.

SUMMARY OF THE INVENTION

An object of the present invention is to provide an optical recording medium capable of producing a high-quality and uniform tracking signal at a low noise level.

Another object of the present invention is to provide a process for producing such an optical recording medium through simple steps.

According to the present invention, there is provided an optical recording medium, comprising a transparent substrate and an optical recording layer disposed on the substrate, wherein the optical recording layer comprises a data recording region and a tracking region having an optical characteristic different from that of the data recording region for guiding a laser beam for recording and reproduction.

According to another aspect of the present invention, there is provided a process for producing an optical recording medium, which comprises forming an optical recording layer on a transparent substrate, and selectively irradiating the optical recording layer with an energy beam to form in the optical recording layer a tracking region for guiding a laser beam for recording and reproduction, which is free of unevenness and has an optical characteristic different from that of the portion of the optical recording layer not irradiated with the energy beam.

According to the present invention, in the thus-formed tracking region of the optical recording layer formed by irradiation with an energy beam, such as ultraviolet rays, bleaching or decoloration is caused due to decomposition of an organic dye in the recording layer, e.g., breakage or oxidation of a structural unit relating to color formation of the dye, whereby the tracking region is caused to have a difference in optical characteristic, such as a reflection light intensity, from the data recording region and is thus capable of providing a tracking signal without resort to a phase difference in reflected light. Further, the process does not involve separation of a stamper or surface deformation of the recording layer, so that the surface accuracy of the substrate surface or the recording layer surface is not deteriorated and the resultant noise level is suppressed to a low level. Further, by effecting uniform or a real irradiation through a mask, a uniform tracking region can be obtained.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
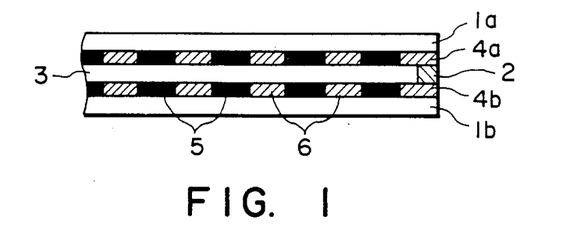
FIG. 1 is a sectional view of an optical recording medium of the present invention.

FIG. 1 is a sectional view of an embodiment of the optical data recording medium according to the present invention. The recording medium comprises transparent substrates $1a$ and $1b$ having an optical recording layer $4a$ and $4b$, respectively, which are bonded to each other by the medium of a spacer 2 by means of an adhesive (or an adhesive also functioning as a spacer) so as to sandwich an air layer 3 therebetween. Each of the recording layers $4a$ and $4b$ is separated into a light-exposed portion 5 and a non-exposed portion 6 which have different optical characteristics (e.g., reflectivities). The exposed portion 5 forms a tracking region, and the non-exposed portion 6 constitutes a data recording region.

Figure 2:
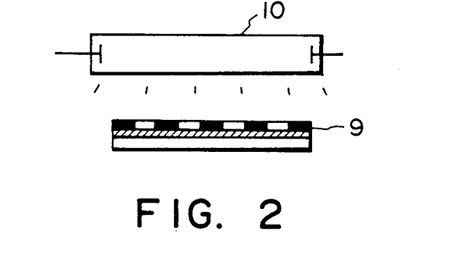
FIG. 2 is a schematic view illustrating a step in a process for producing such an optical recording medium according to the present invention.

FIG. 2 is a schematic view illustrating a step in a representative process for producing such an optical data recording medium. In the process, an optical recording layer $4a$ is formed on a transparent substrate $1a$ having a smooth surface. Then, a photomask 9 having a transparent pattern similar to that of the tracking region to be formed is placed in contact with the optical recording layer $4a$, which is then irradiated through a photomask 9 with an energy beam such as ultraviolet rays from a source 10, whereby the pattern of the photomask 9 is printed on the optical recording layer $4a$. The exposed portion of the optical recording layer $4a$ is bleached or de-colorized due to photochemical decomposition of an organic dye in the recording layer. As a result, there is formed a tracking region free of shape change and yet having a different optical characteristic from that of the non-exposed portion. For the purpose of the present invention, the tracking region may preferably be substantially free of causing a phase change with respect to a laser beam for reproduction, more specifically free of an unevenness of 200 Å or larger. Further, the difference in optical characteristic may preferably be 0.45 or higher in terms of a contrast ratio as defined hereinafter.

The writing or recording of data in the data recording region or data writing region may be effected by irradiation of the recording layer with recording light to cause melt deformation and/or a change in reflectivity of the recording layer due to heat caused by the absorption of the light by the recording layer, i.e., according to a heat mode. In the present invention, the optical recording layers $4a$ and $4b$ may preferably not cause deformation by irradiation with an energy beam for formation of a tracking region but causes a change in optical characteristic, e.g., reflectivity, at a small energy.

Further, for the purpose of data recording and/or reproduction by using a recording light having a wavelength of, e.g., 650 nm or longer, particularly 700-900 nm, the recording layers should preferably show an absorption in the above-described wavelength range for recording. Further, for reproduction, the recording layer should preferably show a large difference in reflectivity between recorded portions (pits) and non-recorded portions, which may preferably not change under irradiation of a reproduction light.

Examples of such a material for the optical recording layer may include: polymethine dyes; anthraquinone derivatives (particularly those having an indanthrene skeleton), dioxadine and its derivatives, triphenodithiazine compounds, phenanthrene derivatives, cyanine compounds, merocyanine compounds, pyrilium compounds, xanthene compounds, triphenylmethane compounds, croconium dyes, azo dyes, crocones, azines, indigoids, azulenes, squarium derivatives, sulfide dyes, and metal dithiolate complexes. Polymethine dyes are especially preferred.

Such a dye or colorant as described above can be used alone or mixed with a stabilizer for the dye to form a dye composition. The stabilizer may be selected from examples thereof described hereinbelow in consideration of the compatibility or solubility with the dye and the solvent. The stabilizer may be added in several wt. % to 50 wt. % of the dye. Too little stabilizer fails to show its effect sufficiently, and the addition in excess of 50 wt. % can lead to a decrease in sensitivity. For these reasons, it is preferred to use the stabilizer in a proportion of 10 wt. % to 30 wt. %, particularly around 20 wt. % of the dye.

Examples of the stabilizer may include various metal chelate compounds, such as four coordination-type compounds having central atoms such as Zn, Cu, Ni, Cr, Co, Mn, Pd and Zr with polydentate ligands inclusive of tetra-dentate ligands such as $N_4$, $N_2O_2$, $N_2S_2$, $S_4$, $O_2S_2$ and $O_4$; a combination of tri-dentate ligands such as $NS_2$, $O_3$ and NOS with another ligand such as water, ammonia, halogen, phosphine, amine, arsine and olefin; or combination of bidentate ligands such as $N_2$, NO, $O_2$ and $S_2$; biscyclopentadienyl ligand, cyclopentadienyl-tropylinium ligand; or combination of the above. Examples of the stabilizer may further include various aromatic amines or diamines, nitrogen-containing aromatic compounds and their onium salts, such as alminium salt; diimmonium salt, pyridinium salt and quinolynium salt. The stabilizer may further be a pyrilium salt which is a salt of an oxygen-containing aromatic compound. These stabilizers can be used in combination of plural species in an appropriate composition variable in view of the coating characteristic of the resultant dye composition, and the stability, the optical characteristics (reflectivity and transmittance) and recording sensitivity of the coating film.

The recording layer comprising an organic dye or dye composition may be formed by a known coating methods, such as dip coating, spray coating, spinner coating, bar coating, blade coating, curtain coating, etc. Further, film formation by vapor deposition can also be applicable depending on the dye used.

The optical recording layer may preferably be thin in view of the recording sensitivity and thick in view of the S/N ratio in reproduction. The optimum thickness thereof can be different depending on the kind of the dye used but may be generally about 500–2000 Å, preferably around 1000 Å.

The optical recording layers 4a and 4b may be irradiated with a light to form a tracking region. The light therefor may comprise a wavelength absorbable by the optical recording layers 4a and 4b to cause a change in their optical characteristics and preferably is capable of irradiating a wide area at a time. Examples of such a light source may include: ultraviolet sources, such as xenon lamp, and mercury lamp; lasers, such as gas laser, dye laser, semiconductor laser, solid laser; and sources of X-rays, electron beam and ion beams.

At this time, the intensity of the light source and distance thereof from the optical recording layer to be irradiated should be controlled so as not to cause deformation of the recording layer due to a factor, such as heat. Further, when the light from the source includes infrared rays, it is preferred to effect the irradiation by the medium of a filter or a cold mirror so that the optical recording layer is not exposed to the infrared rays. The intensity of the light for formation of the tracking region may preferably be 10 mW.hour/cm$^2$–150 mW/cm$^2$, particularly 25–85 mW.hour/cm$^2$. The irradiation with the light can be performed by scanning or projection but may preferably be effected by exposure through a mask to produce a uniform pattern formation.

The transparent substrates 1a and 1b may preferably be composed of materials giving little inconveniences for optical recording and reproduction, particularly one showing a high transmittance with respect to a light used. Examples thereof may include: inorganic materials, such as glass; and resins, such as acrylic resins, polyester resins, polycarbonate resin, vinyl resin, polysulfone resin, polyimide resin, polyacetal resin, polyolefin resin, polyamide resin, cellulose derivatives, etc.

The transparent substrates 1a and 1b may be subjected to a pretreatment, such as primer treatment, under coating, corona treatment, ultraviolet or X-ray treatment, plasma treatment and ion injection, for the purpose of improved adhesiveness with the optical recording layers 4a and 4b, improved optical characteristics (such as transmittance and reflectivity), improved gas barrier characteristic against liberation of gas from the transparent substrates 1a and 1b, and improved storage stability of the optical recording layers 4a and 4b.

Figure 3:
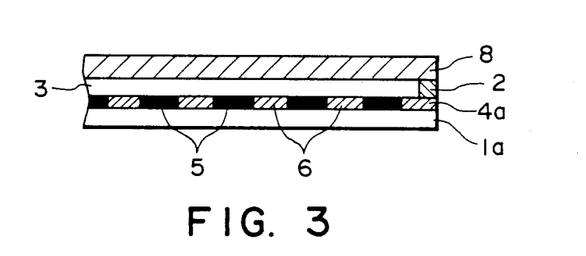
FIGS. 3 and 4 are sectional views each showing another embodiment of the optical recording medium of the present invention.
Figure 4:
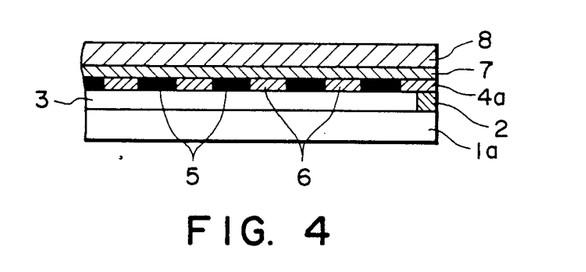

The optical recording medium shown in FIG. 1 may be prepared by bonding a pair of substrates 1a and 1b, respectively) having optical recording layers 4a and 4b, to each other. Alternatively, as shown in FIG. 3, it is also possible to apply a substrate 1a having an optical recording layer 4a thereon to a protective substrate 8 with its side of the optical recording layer 4a to form a single side optical recording medium.

The adhesive used for the above purpose may be thermoplastic adhesive, photo-setting adhesive, thermosetting adhesive, photo- and thermo-setting adhesive or viscous adhesive.

The protective substrate 8 used for a side optical recording medium may be composed of any material used for the purpose in ordinate optical recording media. Specific examples thereof may include polyvinyl chloride, vinyl chloride-vinyl acetate copolymer, polyvinylidene chloride, acrylic polymers such as polymethyl methacrylate, polystyrene, polyvinylbutyral, acetylcellulose, styrene-butadiene copolymer, polyethylene, polypropylene, polycarbonate, epoxy resin, and acrylonitrile-butadiene-styrene copolymer. As the case may be, a sheet of metal such as iron, stainless steel, aluminum, tin, copper or zinc, synthetic or natural paper, etc. can be used for the base member 5. It is further possible to use a laminate of the above materials. The substrate 8 may be subjected to a pretreatment for improvement of adhesiveness, such as a corona discharge treatment, a plasma treatment, and a primer coating.

In the optical recording medium according to the present invention, it is further possible to form a reflective film for improving a contrast on a transparent substrate and form thereon a recording layer. In this case, it is also possible to prevent accumulation of heat in the recording layer due to a light for reproduction if the reflective film is formed of a metal having a good thermal conductivity.

Further, in case of a close laminate structure like an optical card, the recording sensitivity can be further improved by coating the recording layer with a resin film without using an adhesive so as to avoid the suppression of pit formation.

As described above, according to the present invention, there are provided an optical recording medium which is capable of producing a high quality and uniform tracking signal and also is with little noise, and also a process for producing such an optical recording medium through simple steps.

Further, the process for preparation does not require the use of a stamper, so that the cost and durability thereof are not questioned. The process provides a better production yield of the substrate than the injection process and a better productivity than the so-called 2P-process. Further, selection of a substrate material becomes easier because consideration of a stress on the substrate for pre-groove formation is not required. Further, as no pre-groove formation is involved, the process provides a good yield for the formation of the optical recording layer as by spin coating, thus resulting in a decrease in the production cost also from this point.

According to the present invention, it is easy to increase the uniformity of coating film thickness and intimate contact between the coating film and the substrate.

Additionally, a medium having a short track pitch which cannot be transferred by a stamper can be easily and economically produced as by exposure with a shorter wavelength light through a photomask. This is advantageous in correspondence with development of a semiconductor laser beam with a shorter wavelength for minimization of a track pitch.

Hereinbelow, the present invention will be explained more specifically with reference to the following examples. The data described in the examples were measured in the following manner.

[Contrast Ratio]

Figure 5:
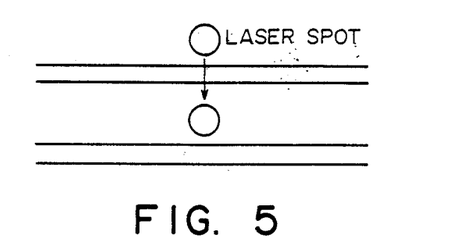
FIG. 5 is an illustration of laser beam spot scanning for measuring a contrast ratio of an optical recording medium.
Figure 6:
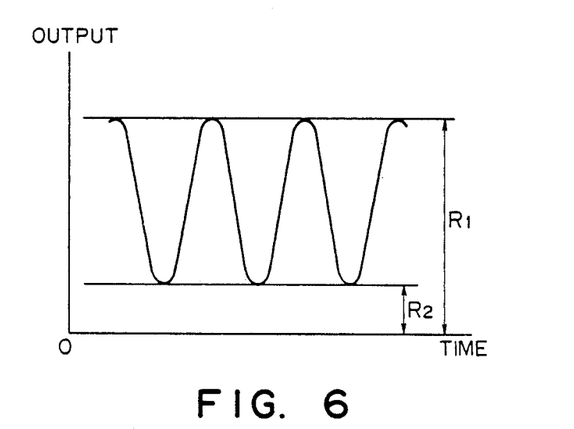
FIG. 6 shows an example of an oscilloscope output obtained as a result.

An optical recording medium is scanned with a laser beam spot across a tracking region (FIG. 5) and the resultant change in reflected light is detected by an oscilloscope as a waveform as shown in FIG. 6. The contrast ratio is calculated by:

[R₁ (reflectivity at a high reflectivity portion) - R₂ (reflectivity at a low reflectivity portion)]/R₁
  Wavelength of laser beam: 830 nm
  Power of laser beam: 0.5 mW (0.27 mW for a card)
  Beam spot diameter: 1.6 um (3 um for a card)
[Noise Level]
Optical disks or cards are driven and the reproduction signals therefrom analyzed by a spectrum analyzer (TR-471 (trade name), available from Advantest Co.).
  Conditions:
  Resolution bandwidth: 30 kHz
  Video bandwidth: 100 Hz
  Pickup numerical aperture: 0.5

EXAMPLE 1

A disk-shaped substrate of an acrylic resin was formed by injection molding in sizes of an outer diameter of 130 mm, an inner diameter of 15 mm and a thickness of 1.2 mm. The disk was coated with a 1.6 wt. % solution of a dye of the following formula (I) in dichloroethane to form a 900 Å-thick optical recording layer.

(I)

On the optical recording layer was superposed a photomask having a spiral pattern with a width of 1.0 micron and a track pitch of 1.6 micron, followed by exposure for pattern transfer to prepare an optical disk. The exposure was effected by using a 4 kW-high pressure mercury lamp issuing ultraviolet rays at an intensity (on the irradiated surface) of 2.1 W/cm² by the medium of a cold mirror for 50 seconds. The total energy on the exposed surface was 29.2 mW.h/cm².

Then, the thus prepared optical disk was rotated to observe a track traverse signal through utilization of an inevitable eccentricity of a disk at points of a radius of 60 mm ($r_{60}$) and a radius of 30 mm ($r_{30}$) while setting an optical head fixed (i.e., without servo control or without controlling the optical head so as to move along the track). As a result, substantially no fluctuation in the track traverse signal was observed, i.e., a uniform periodical change in reflectivity was observed. This means that a spiral tracking region with a reflectivity different from that of the data recording region was formed uniformly at a constant width. Then, the contrast ratios of the optical disks were measured at the points of radii of 60 mm and 30 mm with servo control of the optical head. Further, the noise level of the optical disk was measured in the above described manner. The results are shown in Table 1 appearing at the end hereof.

EXAMPLE 2

An optical disk was prepared in the same manner as in Example 1 except that the optical recording layer was composed of a dye of the following formula (II).

(II)

The optical disk was subjected to measurement of track traverse signals in the same manner as in Example 1, whereby substantially no fluctuation was observed.

Then, the contrast ratios and the noise level of the optical disk were measured in the same manner as in Example 1. The results are also shown in Table 1.

EXAMPLE 3

An acrylic resin disk substrate with an outer diameter of 130 mm, an inner diameter of 15 mm and a thickness of 15 mm was formed by injection molding and coated with colloidal silica ("Colcoat 103X", mfd. by Colcoat K.K.) by spin coating, followed by 3 hours of drying at 50° C. to form a 200 Å-thick primer layer of a silica film. Then, the substrate was further coated with a 2 wt. % solution in dichloroethane of a mixture of the dye of the formula (I) used in Example 1 and 20 wt. % of a diimmonium perchlorate of the formula (III) below as a stabilizer by spin coating to form a 900 Å-thick optical recording layer.

(III)

On the optical recording layer was superposed in contact therewith a photomask having a spiral pattern with a width of 1.0 micron and a track pitch of 1.6 micron, followed by exposure for pattern transfer to form an optical disk. The exposure was effected by using a 4 KW-high pressure mercury lamp generating ultraviolet rays at an intensity (on the irradiated surface) of 2.1 W/cm²² by the medium of a cold mirror for 45 seconds. The total energy on the exposed surface was 26.3 mW.hour/cm²².

The optical disk was subjected to measurement of track traverse signals in the same manner as in Example 1, whereby substantially no fluctuation was observed.

Then, the contrast ratios and the noise level of the optical disk were measured in the same manner as in Example 1. The results are also shown in Table 1.

EXAMPLE 4

An optical disk was prepared in the same manner as in Example 1 except that the optical recording layer was formed by using the dye of the formula (II) used in Example 2.

The optical disk provided substantially no fluctuation in the track traverse signal. The contrast ratios and noise level of the optical disk were measured and the results are also shown in Table 1.

EXAMPLE 5

A polylcarbonate disk substrate with an outer diameter of 130 mm, an inner diameter of 15 mm and a thickness of 1.2 mm was formed by injection molding and coated with a 25 nm-thick vapor-deposition film of aluminum as a reflective film. The reflective film was further coated with a 2 wt. % dichloroethane solution of the dye of the formula (I) used in Example 1 by spin coating to form a 900 Å-thick recording film.

The recording film was covered with a photomask in contact therewith having a spiral pattern with a width of 1.0 micron and a track pitch of 1.6 micron, followed by exposure for transfer of the mask pattern. The exposure was effected by using a 3.5 KW-xenon lamp at an intensity (on the irradiated surface) of 500 mW/cm$^{22}$ through an infrared cut filter for 10 minutes to provide the exposed part with a total energy of 83.3 mW.hour/cm$^2$.

Then, the inner and outer peripheries of the disk substrate were respectively coated in a width of 1 mm each with a UV-curable adhesive containing 0.5 mm-dia. plastic beads, and a polycarbonate disk substrate of the same sizes as used above was placed thereon, followed by exposure of the inner and outer peripheries to UV-light to prepare an optical disk.

The optical disk provided substantially no fluctuation in the track traverse signal. The contrast ratios and noise level of the optical disk were measured and the results are also shown in Table 1.

EXAMPLE 6

An optical disk was prepared in the same manner as in Example 5 except that the recording layer was formed in a thickness of 1000 Å by spin coating of a 6 wt. %-dichloroethane solution of the dye of the formula (II) used in Example 2 and the exposure was effected by using a 3.5 KW-xenon lamp at an intensity (on the irradiated surface) of 1 W/cm$^{22}$ through an infrared cut filter for 9 minutes to provide the exposed part with a total energy of 150 mW.h/cm$^2$.

The optical disk provided substantially no fluctuation in the track traverse signal. The contrast ratios and noise level of the optical disk were measured and the results are also shown in Table 1.

COMPARATIVE EXAMPLE 1

An acrylic resin disk substrate with an outer diameter of 130 mm, an inner diameter of 15 mm and a thickness of 1.2 mm was formed by injection molding and coated with a layer of the following photocurable composition, followed by a 2P process (i.e., a process wherein a photocurable resin layer is photocured while being pressed by a stamper) to form an optical disk substrate having a spiral tracking groove with a width of 0.8 micron, a track pitch of 1.6 micron and a groove depth of 900 Å.

[Photocurable Composition]

| [Photocurable Composition] | |
|---|---|
| Neopentylglycol diacrylate | 70 wt. parts |
| Bisphenol-type epoxy acrylate (a bifunctional acrylate obtained by addition acrylic acid to Epikote 828 (trade name: available from Yuka Shell Epoxy K.K.)) | 30 wt. parts |
| Benzoin isopropyl ether | 1 wt. parts |

The above-prepared optical disk substrate was further dried at 120° C. for 3 hours to remove the remaining monomer and complete the polymerization. Then, the substrate was coated with a 1.6 wt. %-dichloroethane solution of the dye of the above formula (I) used in Example 1 by spin coating to form an optical disk having a 900 Å-thick optical recording layer.

The thus-prepared optical disk was subjected to measurement of track traverse signals in the same manner as in Example 1, whereby substantially no fluctuation in the track traverse signal was observed. Then, the contrast ratios and the noise level of the optical disk were measured in the same manner as in Example 1. The results are also shown in Table 1.

COMPARATIVE EXAMPLE 2

An optical disk was prepared in the same manner as in Comparative Example 1 except that the dye of the formula (II) used in Example 2 was used.

The optical disk was subjected to measurement of track transverse signals in the same manner as in Example 1, whereby substantially no fluctuation was observed.

Then, the contrast ratios and the noise level of the optical disk were measured in the same manner as in Example 1. The results are also shown in Table 1.

COMPARATIVE EXAMPLE 3

An optical disk having a tracking groove was prepared in the same manner as in Comparative Example 1 and then was coated with a primer silica film layer in the same manner as in Example 3, followed further by formation of an optical recording layer using a dye solution in the same manner as in Example 3 to form an optical disk.

The contrast ratios and the noise level of the optical disk were measured in the same manner. The results are also shown in Table 1.

The optical disk was stored for 100 hours in the environments of 60° C. and 90% RH, whereby the pregroove was peeled off.

COMPARATIVE EXAMPLE 4

An optical disk was prepared in the same manner as in Comparative Example 3 except that the dye solution used in Example 4 was used. The contrast ratios and noise level of the optical disk were measured in the same manner as in Example 1. The results are also shown in Table 1.

EXAMPLE 7

A transparent resin substrate in sizes of 54 mm×86 mm and 0.4 mm in thickness (a polycarbonate plate containing an ultraviolet absorber; Panlite 211 (trade name) available from Teijin Kasei K.K.) was coated with colloidal silica ("Colcoat 103X", mfd. by Colcoat K.K.) by spin coating, followed by 3 hours of drying at 50° C. to form a 500 Å-thick primer layer of a silica film. Then, the substrate was further coated with a 6 wt. %-dichloroethane solution of the dye of the formula (I) used in Example 1 by spin coating to form a 1000 Å-thick optical recording layer.

The optical recording layer was covered with a photomask: having a pattern of lines with a track width of 3 microns and a track pitch of 13 microns, followed by exposure for transfer of the track pattern. The exposure was effected by using a 3.5 KW-xenon lamp at an intensity (on the irradiated surface) of 2.1 W/cm$^2$ through an infrared cut filter for 60 seconds to provide the exposed part with a total energy of 35 mW.hour/cm$^2$.

Then, a 5 micron-thick 40 mm×80 mm-rectangular polyethylene terephthalate film (Lumirror (trade name) available from Toray K.K.) were placed on the optical recording layer, then a 50 micron-thick thermoplastic adhesive film (ethylene-vinyl acetate-type dry film) was placed thereon, and further a 0.3 mm-thick white polycarbonate film (Toughlon (trade name) available from Idemitsu-Sekiyu K.K.) was placed thereon to be head-bonded by a heat roller having a surface temperature of 110° C. to prepare an optical card.

Figure 7:
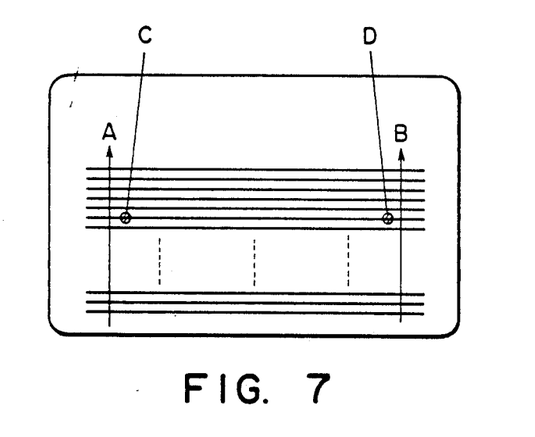
FIG. 7 is an illustration of measurement of a track traverse signals and a contrast ratio for an optical card.

The lateral sides of the thus prepared optical card were optically scanned along arrows A and B as shown in FIG. 7 to observe track traverse signals whereby substantially no fluctuation was observed at either of the portions A and B. Then, the contrast ratios were measured at portions in the neighborhood of points C and D shown in FIG. 7, and the noise level was measured in the same manner as in Example 1. The results are shown in Table 2 appearing at the end hereof.

EXAMPLE 8

Similarly as in Example 7, transparent resin substrate was coated with a primer layer and then with a 6 wt. % solution in dichloroethane of the dye of the formula (II) in Example 2 by spin coating to form a 1000 Å-thick optical recording layer.

The optical recording layer was covered with a photomask having a pattern of lines with a track width of 3 microns and a track pitch of 13 microns, followed by exposure for transfer of the track pattern. The exposure was effected by using a 3.5 KW-xenon lamp at an intensity (on the irradiated surface) of 2.1 W/cm$^2$ through an infrared cut filter for 1 minute to provide the exposed part with a total energy of 35 mW.hour/cm$^2$.

Thereafter, the procedure of Example 7 was followed by prepare an optical card. Then, the contrast ratios and the noise level of the optical card were measured in the same manner as in Example 7. The results are also shown in Table 2.

EXAMPLE 9

A white resin substrate of polycarbonate in sizes of 54 mm×86 mm×0.3 mm in thickness (Toughlon (trade name) available from Idemitsu Sekiyu Kagaku K.K.) was coated with a 30 nm-thick aluminum vapor-deposition film as a reflective film. Then, the reflective film was coated with a 6 wt. % solution in dichloroethane of the dye of the formula (II) used in Example 2 by spin coating to form a 1000 Å-thick recording film.

The recording layer was covered with a photomask having a pattern of lines with a track width of 3 microns and a track pitch of 13 microns, followed by exposure for transfer of the track pattern. The exposure was effected by using a 3.5 KW-xenon lamp at an intensity (on the irradiated surface) of 300 mW/cm$^2$ by the medium of a cold mirror for 10 minutes to provide the exposed part with a total energy of 50 mW/hour/cm$^2$.

Then, on the peripheral side of the recording film, a 50 micron-thick and 1 mm-wide frame-shaped film of thermoplastic adhesive film (ethylene-vinylacetate-type dry film) was placed, and further a 0.4 mm-thick transparent substrate film (a polycarbonate plate containing an ultraviolet absorber; Panlite 211 available from Teijin Kasei K.K.) was placed thereon to be heat-bonded by a heat-roller having a surface temperature of 100° C. to prepare an optical card.

The thus-obtained optical cards were subjected to various measurements in the same manner as in Example 7. The results are also shown in Table 2.

COMPARATIVE EXAMPLE 5

A transparent resin substrate as used in Example 7 was coated with a layer of the photocurable composition used in Comparative Example 1 and subjected to the 2P process similarly as in Comparative Example 1 to form an optical card substrate having a pattern of linear tracking grooves having a depth of 1000 Å and providing a track width of 3 microns and a track pitch of 13 microns.

The above-prepared optical card substrate was further dried at 120° C. for 3 hours to remove the remaining monomer and complete the polymerization. Then, the substrate was further coated with a colloidal silica ("Colcoat 103X", mfd. by Colcoat K.K.) by spin coating, followed by 3 hours of drying at 50° C. to form a 500 Å-thick primer layer of a silica film. Then, the substrate was further coated with a 6 wt. % solution in dichloroethane of the dye of the formula (II) used in Example 2 by spin coating to form a 1000 Å-thick optical recording layer.

Then, a 5 micron-thick 40 mm×80 mm-rectangular polyethylene terephthalate film (Lumirror (trade name) available from Toray K.K.) were placed on the optical recording layer, than a 50 micron-thick thermoplastic adhesive film (ethylene-vinyl acetate-type dry film) was placed thereon, and further a 0.3 mm-thick white polycarbonate film (Toughlon (trade name) available from Idemitsu Sekiyu K.K.) was placed thereon to be head-bonded by a heat roller having a surface temperature of 110° C. to prepare an optical card.

The thus-prepared optical card was subjected to measurement of the contrast ratios and the noise level in the same manner as in Example 7. The results are also shown in Table 2.

COMPARATIVE EXAMPLE 6

An optical card substrate having a pattern of linear tracking grooves having a depth of 1000 Å and providing a track width of 3 microns and a track pitch of 13 microns was prepared in the same manner as in Comparative Example 5 through the 2P process.

Then, the card substrate was coated with a 6 wt. % solution in dichloroethane of the dye of the formula (II) used in Example 2 on the tracking grooves by spin coating to form a 1000 Å-thick recording film.

Then, on the peripheral side of the recording film, a 50 micron-thick and 1 mm-wide frame-shaped film of thermoplastic adhesive film (ethylene-vinylacetate-type dry film) was placed, and further a 0.4 mm-thick white substrate film (a polycarbonate plate; Toughlon available from Idemitsu Sekiyu Kagaku K.K.) was placed thereon to be heat-bonded by a heat-roller having a surface temperature of 110° C. to prepare an optical card.

The thus-obtained optical cards were subjected to various measurements in the same manner as in Example 7. The results are also shown in Table 2.

REFERENCE EXAMPLE 1

A disk substrate coated with a 900 Å-thick optical recording layer was prepared in the same manner as in Example 1.

The optical recording layer was exposed through a photomask having a spiral pattern with a width of 1.0 micron and a track pitch of 1.6 micron disposed in contact with the optical recording layer.

The exposure was effected by using a 3.5 KW-xenon lamp at an intensity (on the irradiated surface) of 450 mW/cm$^2$ for 1 minute to provide a total energy of 7.5 mW.hour/cm$^2$. The resultant recording layer showed a poor pattern transfer.

The contrast ratios and noise level of the thus-prepared optical disk were measured in the same manner as in Example 1 are shown in Table 1.

REFERENCE EXAMPLE 2

A disk substrate coated with a 900 Å-thick optical recording layer was prepared in the same manner as in Example 1.

The optical recording layer was exposed through a photomask having a spiral pattern with a width of 1.0 micron and a track pitch of 1.6 micron disposed in contact with the optical recording layer.

The exposure was effected by using a 4 KW high-pressure mercury lamp at an intensity (on the irradiated surface) of 3 W/cm$^2$ by the medium of a cold mirror for 3.5 minutes to provide a total energy of 175 mW.hour/cm$^2$. The recording layer resulted in a deformation and a large fluctuation in track traverse signals at the positions near $r_{60}$ and $r_{30}$.

The contrast ratios and noise level of the thus-prepared optical disk were measured in the same manner as in Example 1 and the results are shown in Table 1.

As is shown in the following Tables 1 to 3, the optical recording media according to the present invention provided good contrast ratios and low noise level while they were prepared through a simple process.

TABLE 1

| Example | Contrast ratio $r_{60}$ | $r_{30}$ | Noise level (dB) |
|---|---|---|---|
| 1 | 0.76 | 0.73 | −82.3 |
| 2 | 0.71 | 0.70 | −80.2 |
| 3 | 0.81 | 0.83 | −79.8 |
| 4 | 0.75 | 0.75 | −80.3 |
| 5 | 0.72 | 0.74 | −81.4 |
| 6 | 0.69 | 0.70 | −80.2 |
| Comparative Example | | | |
| 1 | 0.36 | 0.22 | −75.4 |
| 2 | 0.44 | 0.26 | −70.2 |
| 3 | 0.38 | 0.37 | −68.4 |
| 4 | 0.45 | 0.41 | −68.9 |

TABLE 2

| Example | Contrast ratio C part | D part | Noise level (dB) |
|---|---|---|---|
| 7 | 0.71 | 0.72 | −55.8 |
| 8 | 0.69 | 0.70 | −55.2 |
| 9 | 0.67 | 0.68 | −56.2 |
| Comparative Example | | | |
| 5 | 0.45 | 0.41 | −50.4 |
| 6 | 0.39 | 0.37 | −50.1 |

TABLE 3

| Reference Example | Contrast ratio $r_{60}$ | $r_{30}$ | Noise level (dB) |
|---|---|---|---|
| 1 | 0.15 | 0.12 | −75.2 |
| 2 | 0.67 | 0.55 | −50.1 |

What is claimed is:

1. An optical recording medium, comprising a transparent substrate and an optical recording layer disposed on the substrate, wherein said optical recording layer comprises a data recording region and a tracking region having an optic la characteristic different from that of the data recording region for guiding a laser beam for recording and reproduction, said tracking region being free of unevenness.

2. A medium according to claim 1, wherein said optical recording layer comprises a film comprising an organic dye.

3. A medium according to claim 2, wherein the organic dye is a polymethine dye.

4. A medium according to claim 1, wherein said tracking region shows a reflectivity with respect to a near-infrared wavelength which is higher than that of the data recording region.

5. A medium according to claim 1, wherein the tracking region has been bleached.

6. A process for producing an optical recording medium, which comprises the steps of forming an optical recording layer on a transparent substrate, and selectively irradiating the optical recording layer with an energy beam sufficient to form in the optical recording layer a tracking region for guiding a laser beam for recording and reproduction, but insufficient to deform said optical recording layer, said tracking region being free of unevenness and has an optical characteristic different from that of the portion of the optical recording layer not irradiated with the energy beam.

7. A process according to claim 6, wherein the optical recording layer is irradiated with the energy beam through a mask.

8. A process according to claim 6, wherein said energy beam is a light having a wavelength of 800 nm or below.

9. A process according to claim 6, wherein said energy beam has an intensity of 10 mW.h/cm$^2$–150 mW.h/cm$^2$ at the surface of the optical recording layer.

10. A process according to claim 9, wherein said energy beam has an intensity of 25 mW.h/cm$^2$–85 mW.h/cm$^2$ at the surface of the optical recording layer.

11. A process according to claim 6, wherein said optical recording layer comprises an organic dye.

12. A process according to Claim 11, wherein the organic dye is a polymethine dye.

13. A process according to claim 6, wherein said selective irradiating step comprises the step of irradiating the optical recording layer with the energy beam through a filter.

14. A process according to claim 6, wherein said selective irradiating step comprises the step of irradiating the optical recording layer with the energy beam through a cold mirror.

15. A process according to claim 6, wherein said forming step comprises the step of forming the optical recording layer by coating on the transparent substrate.

* * * * *

UNITED STATES PATENT AND TRADEMARK OFFICE
CERTIFICATE OF CORRECTION

PATENT NO. : 4,954,380

DATED : September 4, 1990

INVENTOR(S) : OSAMU KANOME ET AL.

It is certified that error appears in the above-identified patent and that said Letters Patent is hereby corrected as shown below:

COLUMN 1

Line 26, "write)'" should read --write)'--.

COLUMN 2

Line 23, "the" should read --be--.

COLUMN 4

Line 10, "causes" should read --cause--.
Line 59, "alminium" should read --aluminium--.

COLUMN 5

Line 2, "a" should be deleted.
Line 59, "respectively)" should read --respectively,--.

COLUMN 10

Line 55, "tomask:" should read --tomask--.

COLUMN 11

Line 29, "prepare" should read --preparing--.

UNITED STATES PATENT AND TRADEMARK OFFICE
CERTIFICATE OF CORRECTION

PATENT NO. : 4,954,380

DATED : September 4, 1990

INVENTOR(S) : OSAMU KANOME ET AL.

It is certified that error appears in the above-identified patent and that said Letters Patent is hereby corrected as shown below:

COLUMN 14

Line 12, "optic la" should read --optical--.

Signed and Sealed this

Fifth Day of May, 1992

Attest:

DOUGLAS B. COMER

Attesting Officer

Acting Commissioner of Patents and Trademarks